(12) United States Patent
Matsubara et al.

(10) Patent No.: US 8,853,140 B2
(45) Date of Patent: Oct. 7, 2014

(54) GREASE COMPOSITION AND BEARING

(75) Inventors: Kenichiro Matsubara, Fujisawa (JP); Yuji Onuki, Fujisawa (JP)

(73) Assignee: Kyodo Yushi Co., Ltd., Kanagawa (JP)

( * ) Notice: Subject to any disclaimer, the term of this patent is extended or adjusted under 35 U.S.C. 154(b) by 677 days.

(21) Appl. No.: 12/307,175

(22) PCT Filed: Jul. 5, 2007

(86) PCT No.: PCT/JP2007/063442
§ 371 (c)(1),
(2), (4) Date: Dec. 31, 2008

(87) PCT Pub. No.: WO2008/004613
PCT Pub. Date: Jan. 10, 2008

(65) Prior Publication Data
US 2009/0325827 A1  Dec. 31, 2009

(30) Foreign Application Priority Data
Jul. 5, 2006  (JP) .................................. 2006-185719

(51) Int. Cl.
*C10M 169/04* (2006.01)
*C10M 169/06* (2006.01)
*C10M 147/02* (2006.01)
*C10M 129/42* (2006.01)
*F16C 33/66* (2006.01)

(52) U.S. Cl.
CPC ............ *C10M 169/04* (2013.01); *C10M 169/06* (2013.01); *C10M 2207/123* (2013.01); *C10M 2207/127* (2013.01); *C10M 2211/0206* (2013.01); *C10M 2211/0406* (2013.01); *C10M 2211/063* (2013.01); *C10M 2213/023* (2013.01); *C10M 2213/043* (2013.01); *C10M 2213/0606* (2013.01); *C10N 2210/01* (2013.01); *C10N 2210/02* (2013.01); *C10N 2230/08* (2013.01); *C10N 2230/12* (2013.01); *C10N 2230/64* (2013.01); *C10N 2240/02* (2013.01); *C10N 2250/10* (2013.01); *F16C 33/6633* (2013.01); *C10M 2201/0416* (2013.01); *C10M 2201/1056* (2013.01); *C10M 2207/126* (2013.01); *C10M 2213/0626* (2013.01); *C10M 2215/222* (2013.01); *C10M 2219/0445* (2013.01); *C10N 2220/022* (2013.01); *C10N 2230/74* (2013.01)
USPC .......................................... 508/506; 508/181

(58) Field of Classification Search
USPC .................................................. 508/181, 506
See application file for complete search history.

(56) References Cited

U.S. PATENT DOCUMENTS

| | | | | |
|---|---|---|---|---|
| 2,722,516 A | * | 11/1955 | Merker ......................... | 508/512 |
| 6,329,326 B1 | * | 12/2001 | Iso et al. ....................... | 508/182 |
| 2004/0033911 A1 | * | 2/2004 | Mikami et al. ................ | 508/511 |
| 2005/0009713 A1 | * | 1/2005 | Kohara et al. ................. | 508/165 |
| 2006/0281641 A1 | * | 12/2006 | MacCone ..................... | 508/182 |
| 2009/0270292 A1 | * | 10/2009 | Nonaka et al. ................ | 508/416 |

FOREIGN PATENT DOCUMENTS

| | | | |
|---|---|---|---|
| EP | 0 322 916 | | 7/1989 |
| EP | 1 764 407 | | 3/2007 |
| JP | 01-272696 | | 10/1989 |
| JP | 2001-354986 | | 12/2001 |
| JP | 2001354986 A | * | 12/2001 |
| JP | 2004-188607 | | 7/2004 |
| JP | 2004-224823 | | 8/2004 |
| JP | 2005-290278 | | 10/2005 |
| JP | 2006241386 A | * | 9/2006 |
| WO | WO 2006/090779 | | 8/2006 |
| WO | WO 2006/095644 | | 9/2006 |
| WO | WO 2007/026868 | | 3/2007 |

OTHER PUBLICATIONS

International Search Report for PCT/JP2007/063442, mailed Oct. 23, 2007.
Written Opinion of the International Searching Authority for PCT/JP2007/063442, mailed Oct. 23, 2007.
European Search Report issued for European Patent Application No. 07768191.4-1352, dated Aug. 21, 2013.

* cited by examiner

*Primary Examiner* — James Goloboy
(74) *Attorney, Agent, or Firm* — Nixon & Vanderhye P.C.

(57) ABSTRACT

The invention provides a grease composition comprising a base oil consisting of a fluorinated oil and an antirust agent, wherein said antirust agent comprises an aliphatic dibasic acid salt of the formula (1) in an amount of not less than 0.1% by mass and less than 1.0% by mass based on the total mass of the grease composition:

$$(CH_2)_n(COO)_2M_m \quad (1)$$

wherein n is an integer of 1 to 19, M is an alkali or alkaline earth metal, m is 2 when M is an alkali metal and m is 1 when M is an alkaline earth metal, and a bearing wherein the grease is packed. The grease exerts less effects on the environment. It is low in evaporation loss at a high temperature, shows good antirust property and can be suitably used in a ball bearing operated at a high temperature.

3 Claims, No Drawings

GREASE COMPOSITION AND BEARING

This application is a National Phase of International Application No. PCT/JP2007/063442, filed 5 Jul. 2007, which claims priority to Japan Application No. 2006-185719, filed 5 Jul. 2006, the entire contents of each of which are hereby incorporated by reference.

FIELD OF THE INVENTION

This invention relates to a grease composition and a bearing, more particularly, a fluorine grease composition which is low in evaporation loss and high in antirust property and which is suitably used in a ball bearing operated at a high temperature and a bearing in which the grease composition is packed.

BACKGROUND ART

Properties required for a grease composition to increase its lubrication life at a high temperature are low evaporation loss, high oxidation stability, excellent antirust property, excellent lubricating property and the like. There have been various proposals to improve antirust property and lubrication life of a grease composition.

For example, there has been proposed a grease composition based on perfluoropolyether or fluoropolyether derivatives, which shows excellent performance in applications where the parts to be lubricated run at high speeds, at the same time exhibiting the good performance of greases based on non-functional perfluoropolyethers as regards the viscostaticity as a function of temperature, the vapor tension and the lubricating properties under limit conditions. The grease composition also shows high anticorrosive property (see Patent Document 1).

There has also been proposed a lubricating grease composition which comprises a perfluoropolyether base oil and as a thickening agent, at least one of an aliphatic dicarboxylic acid metal salt, a monoamide monocarboxylic acid metal salt, and a monoester carboxylic acid metal salt, and the grease composition shows antiwear property to a material to be lubricated, antileakage property, and washing property and it is inexpensive (see Patent Document 2).

In order to impart antirust property to a grease composition, it is general to add an antirust agent. An inorganic passivating agent is usually used as an antirust agent in a fluorine containing grease composition for a ball bearing used at a high temperature. In particular, sodium nitrite has been widely used as most effective antirust agent. However, it is known that sodium nitrite reacts with a secondary amine under acidic condition to form N-nitrosamine. Since N-nitrosamine is an environmentally harmful substance, there is a need for an antirust agent in place of sodium nitrite.

[Patent Document 1] JP-A-1-272696
[Patent Document 2] JP-A-2001-354986

DISCLOSURE OF THE INVENTION

Problems to be Solved by the Invention

An object of the present invention is to provide a fluorine grease composition which is suitably used in a ball bearing operated at a high temperature and which shows good antirust property and stable lubricating property for a long time and exerts less effects on the environment and a bearing in which the grease composition is packed.

Another object of the present invention is to provide a fluorine grease composition which is low in evaporation loss, shows good antirust property and exerts less effects on the environment and a bearing in which the grease composition is packed.

Means for Solving the Problems

The inventors of the present invention have conducted various studies to solve the above problems and found that the use of a base oil comprising a fluorinated oil and a specific amount of a dibasic acid salt which exerts less effects on the environment gives a grease composition which is low in evaporation loss at a high temperature, shows good antirust property and can be suitably used in a ball bearing operated at a high temperature.

The present invention provides a fluorine grease composition and a bearing as described below.

1. A grease composition comprising a base oil consisting of a fluorinated oil and an antirust agent, wherein said antirust agent comprises an aliphatic dibasic acid salt of the formula (1) in an amount of not less than 0-1% by mass and less than 1.0% by mass based on the total mass of the grease composition:

$$(CH_2)_n(COO)_2M_m \qquad (1)$$

wherein n is an integer of 1 to 19, M is an alkali or alkaline earth metal, m is 2 when M is an alkali metal and m is 1 when M is an alkaline earth metal.

2. The grease composition of the above item 1, wherein the fluorinated oil is perfluoroalkylpolyether oil.
3. The grease composition of the above item 1 or 2, wherein the aliphatic dibasic acid salt is an alkali metal salt.
4. A bearing in which the grease composition of any one of the above items 1 to 3 is packed.

Effects of the Invention

The fluorine grease composition of the present invention for which reduction of effects on the environment is taken into consideration is low in evaporation loss, shows good antirust property and is suitably used in a ball bearing operated at a high temperature. It shows stable lubricating property for a long time. In particular, if a dibasic acid salt such as sodium sebacate, sodium azelate, or sodium suberate is used as an antirust agent, it does not exert a harmful influence on human body or the environment unlike sodium nitrite and shows good antirust property. The use of a dibasic acid salt in a specific amount gives such remarkable advantage that evaporation loss is greatly reduced even under a high temperature condition.

The present invention is based on the finding that the use of a fluorinated oil as a base oil and a specific amount of a specific dibasic acid salt which is less environmentally harmful as an antirust agent gives a grease composition which shows excellent antirust property comparable to a grease composition in which sodium nitrite is used as an antirust agent, and which is low in evaporation loss under high temperature condition and does not reduce heat resistance.

BEST MODES FOR CARRYING OUT THE INVENTION

The present invention will hereafter be explained in detail.

A fluorinated oil which can be used as a base oil in the fluorine grease composition of the present invention is not limited to specific ones as long as it has fluorine atom in its molecule and excellent heat resistance and can be used as a lubricating oil. Particularly preferred are perfluoroalkylpolyether oils which are inert and have low vapor pressure. Preferably, such perfluoroalkylpolyether oils have a kinetic viscosity (at 40 degree C.) of preferably 5-1500 mm$^2$/s, more preferably 50-1000 mm$^2$/s, and most preferably 70-800 mm$^2$/s. Generally, those having a kinetic viscosity (at 40 degree C.) of less than 5 mm$^2$/s have a low flow point but show a high amount of evaporation, while those having a kinetic viscosity (at 40 degree C.) of more than 1500 mm$^2$/s show a low amount of evaporation but have a high flow point. If an amount of evaporation of an oil becomes high, heat resistance of the oil will be decreased, while if a flow point of an oil becomes high, it will not be possible to use the oil at a low temperature.

An amount of the base oil in the grease composition of the present invention is preferably 50-98% by mass, and more preferably 65-85% by mass based on the total amount of the base oil, a thickening agent and an antirust agent.

A thickening agent which can be used in the grease composition of the present invention is not limited to specific ones as long as it is a solid which can disperse in a fluorinated oil to form a grease form (semi-solid). Examples include fluorine resins such as polytetrafluoroethylene and polytrifluoroethylene, metal soaps such as Li soaps, Ca soaps and Al soaps, complex soaps such as Li complex soaps, Ca complex soaps and Al complex soaps, urea compounds, urethane compounds, bentonite, silicon compounds, sodium terephthalate, melamine cyanurate, carbon black and the like. Among them, preferred are those having high heat resistance such as polytetrafluoroethylene, silica, melamine cyanurate, carbon black and the like.

An amount of the thickening agent in the grease composition of the present invention is preferably 1-49% by mass and more preferably 10-40% by mass based on the amount of the grease composition. If the amount is less than 1% by mass, flow property of the grease composition tends to become too high, while if the amount is greater than 49% by mass, the grease composition tends to become too hard, and it will be difficult to use such greases.

The grease composition of the present invention comprises as an antirust agent the aliphatic dibasic acid salt of the formula (1) in an amount of not less than 0.1% by mass and less than 1.0% by mass. If the amount is less than 0.1% by mass, no antirust effect is expected, while if it is not less than 1.0% by mass, an amount of evaporation becomes high as compared to a case where it is less than 1.0% by mass and heat resistance will be lost.

$$(CH_2)_n(COO)_2M_m \quad (1)$$

wherein n is an integer of 1 to 19, M is an alkali or alkaline earth metal, m is 2 when M is an alkali metal and m is 1 when M is an alkaline earth metal.

Specific examples of the aliphatic dibasic acid salts include sodium sebacate, lithium sebacate, sodium adipate, lithium adipate, sodium azelate, lithium azelate and the like. Particularly preferred is sodium sebacate.

The present invention will be explained more specifically with reference to the following examples.

Components listed in the table were used to prepare grease compositions to be tested. As thickening agents, polytetrafluoroethylene (PTFE), silica, a mixture of melamine cyanurate (MCA) and PTFE, and carbon black were used.

As base oils, three kinds of perfluoroalkylpolyether (PFAE) oils having kinetic viscosities (at 40 degree C.) of 420 mm$^2$/s, 80 mm$^2$/s and 700 mm$^2$/s were used.

As antirust agents, there were used 0.2% by mass of sodium sebacate, 0.5% by mass of sodium sebacate, 0.8% by mass of sodium sebacate, 2.0% by mass of sodium sebacate, 0.5% by mass of Ba sulfonate (Ba dinonylnaphthalene sulfonate), 0.5% by mass of succinic acid anhydride, 0.5% by mass of zinc stearate, and 0.5% by mass of sodium stearate.

Test Method

Antirust property: Emcor antirust test (IP220)

Evaluation Criteria

0: No rust

4: Rust is formed on 5-10% of the outer race surface.

5: Rust is formed on more than 10% of the outer race surface.

Evaporation Loss:

Test Method

An SPCC steel plate (60×80×1 mm) is uniformly coated with a grease to be tested in a thickness of about 2 mm and allowed to stand for a given time period in a constant temperature air bath at a given temperature and ten weight loss (i.e., evaporation loss) is measured.

The given temperature: 230 degree C.

The given time period: 1200 hours

Not less than 10% of evaporation loss is judged to be not good.

Results

Examples 1-8 wherein 0.2-0.8% by mass of sodium sebacate were contained showed good antirust property. Examples 9-11 wherein 0.5% by mass of dibasic acid salts other than sodium sebacate were contained also showed good antirust property.

Comparative Example 1 wherein sodium sebacate was not contained, and Comparative Examples 2-5 wherein antirust agents other than dibasic acid salts were contained showed poor antirust property.

Comparing the data for Examples 1-3 and Comparative Examples 1 and 6 wherein the contents of sodium sebacate were changed, Examples 1-3 wherein not less than 0.1% by mass and less than 1.0% by mass of sodium sebacate were contained showed excellent antirust property and not more than 10% of evaporation loss and excellent heat resistance. In contrast, Comparative Example 1 wherein sodium sebacate was not contained did not show antirust property and Comparative Example 6 wherein 2.0% by mass of sodium sebacate was contained showed poor heat resistance.

TABLE 1

|  | Example 1 | Example 2 | Example 3 | Example 4 | Example 5 | Example 6 |
|---|---|---|---|---|---|---|
| Thickening agent (% by mass) | PTFE (25.0) | PTFE (25.0) | PTFE (25.0) | silica (10.0) | MCA (20.0) PTFE (5.0) | carbon (10.0) |
| Base oil (kinetic viscosity) (% by mass) | PFAE 420 (74.5) | PFAE 420 (74.8) | PFAE 420 (74.2) | PFAE 420 (89.5) | PFAE 420 (74.5) | PFAE 420 (89.5) |

TABLE 1-continued

|  | Example 1 | Example 2 | Example 3 | Example 4 | Example 5 | Example 6 |
|---|---|---|---|---|---|---|
| Antirust agent (% by mass) | Na sebacate (0.5) | Na sebacate (0.2) | Na sebacate (0.8) | Na sebacate (0.5) | Na sebacate (0.5) | Na sebacate (0.5) |
| Antirust property | 0 | 0 | 0 | 0 | 0 | 0 |
| Evaporation loss (% by mass) | 8.0 | 7.5 | 8.4 | — | — | — |

TABLE 2

|  | Example 7 | Example 8 | Example 9 | Example 10 | Example 11 |
|---|---|---|---|---|---|
| Thickening agent (% by mass) | PTFE (25.0) | PTFE (25.0) | PTFE (25.0) | PTFE (25.0) | PTFE (25.0) |
| Base oil (kinetic viscosity) (% by mass) | PFAE 80 (74.5) | PFAE 700 (74.5) | PFAE 420 (74.5) | PFAE 420 (74.5) | PFAE 420 (74.5) |
| Antirust agent (% by mass) | Na sebacate (0.5) | Na sebacate (0.5) | Li sebacate (0.5) | Na adipate (0.5) | Na azelate (0.5) |
| Antirust property | 0 | 0 | 0 | 0 | 0 |
| Evaporation loss (% by mass) | — | — | — | — | — |

TABLE 3

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Thickening agent (% by mass) | PTFE (25.0) | PTFE (25.0) | PTFE (25.0) | PTFE (25.0) | PTFE (25.0) | PTFE (25.0) |
| Base oil (kinetic viscosity) (% by mass) | PFAE 420 (75.0) | PFAE 420 (74.5) | PFAE 420 (74.5) | PFAE 420 (74.5) | PFAE 420 (74.5) | PFAE 420 (73.0) |
| Antirust agent (% by mass) | not added (0.0) | Ba sulfonate (0.5) | succinic anhydride (0.5) | Zn stearate (0.5) | Na stearate (0.5) | Na sebacate (2.0) |
| Antirust property | 5 | 4 | 4 | 4 | 4 | 0 |
| Evaporation loss (% by mass) | 7.4 | — | — | — | — | 14.6 |

In the tables, "-" in the items of evaporation loss means no measurement.

What is claimed is:

1. A grease composition comprising:
   (a) a base oil consisting of a perfluoroalkylpolyether oil having a kinetic viscosity (at 40 degree C.) of 420-700 mm$^2$/s;
   (b) a thickening agent being a polytetrafluoroethylene in an amount of 10-40% by mass based on the total mass of the grease composition; and
   (c) an antirust agent being sodium sebacate in an amount of not less than 0.1% by mass and less than 1.0% by mass based on the total mass of the grease composition.

2. A bearing in which the grease composition of claim 1 is packed.

3. The grease composition of claim 1, wherein the amount of the antirust agent is not less than 0.2% by mass and not more than 0.8% by mass based on the total mass of the grease composition.

* * * * *